J. T. BLADEN.
Sink-Trap.
No. 213,163. Patented Mar. 11, 1879.
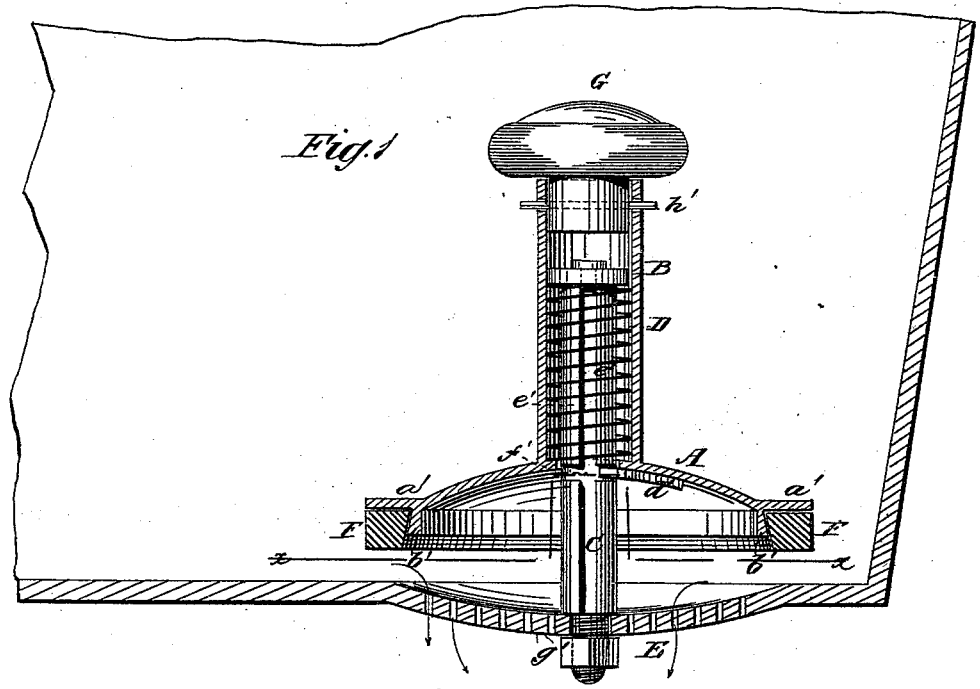
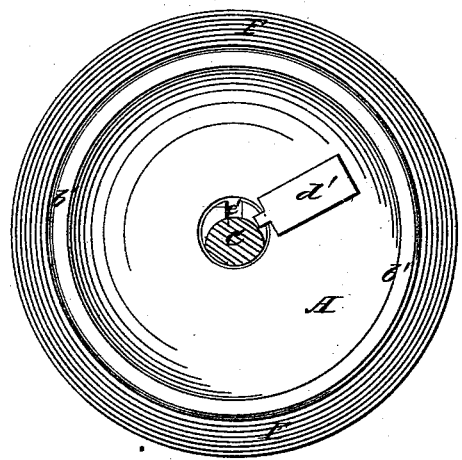
WITNESSES:
Francis McArdle
C. Sedgwick
INVENTOR:
J. T. Bladen
BY Munn & Co
ATTORNEYS.

UNITED STATES PATENT OFFICE.

JOHN T. BLADEN, OF BROOKLYN, NEW YORK.

IMPROVEMENT IN SINK-TRAPS.

Specification forming part of Letters Patent No. 213,163, dated March 11, 1879; application filed February 4, 1879.

*To all whom it may concern:*

Be it known that I, JOHN T. BLADEN, of Brooklyn, in the county of Kings and State of New York, have invented a new and Improved Sink-Trap, of which the following is a specification:

Figure 1 shows a section of a sink and a vertical section of the trap applied thereto. Fig. 2 is a plan of the under side of the trap.

Similar letters of reference indicate corresponding parts.

The object of this invention is to furnish a trap for preventing the escape of sewer-gas into houses, that is to be attached to the inside of sinks and basins, and be subject always to instant adjustment and control.

The invention consists of a concavo-convex disk, A, with a hole in its center, and with a flat flange or rim, $a'$, on the under side of which, and at right angles with it, is soldered or otherwise fastened, a ring, $b'$. Set over the hole and extending upward, is a tube, B, of greater internal diameter than the hole itself. On the under side of the disk a small plate, $d'$, is fastened with finger extending slightly over the central hole. All these parts are preferably made of metal.

The other parts of the trap consist of the metallic pin C, that has a longitudinal slot or keyway, $e'$, and a transverse groove, $f'$, and on its upper end a head or cap, and on its lower end a screw. Around this pin is the coiled spring D, which, when it is inserted with the pin in the tube B, extends from the head of the pin to the upper surface of the disk. It is intended to secure the trap over the drain-pipe of a sink or the overflow-pipe of a basin by setting the disk over the apertures or strainer E, and passing the pin with surrounding spring down through the tube, through the central hole of the strainer, and securing it there with the nut $g'$, as shown.

It will be seen that the action of the coiled spring is to firmly press the disk part of the trap against the surface that it covers.

An annular packing, F, of rubber or other suitable material, that is placed in the angle formed by the ring $b'$ and rim $a'$, makes a gas-tight joint between the sink or basin-surface and the trap when the latter is closed against the strainer by the action of the spring. In the upper end of the tube B a plug or stopper, G, of metal or wood, is secured by a pin, $h'$, being thrust through it and the tube, as shown.

When the trap is closed, and it is desired to open it to permit the outflow of contents of the sink or basin, an upward pull will raise the disk against the action of the spring to a height sufficient to turn it, so that the finger of plate $d'$ will turn out of the longitudinal groove $e'$ into the transverse one $f'$, and hold the disk up by engaging therein. On reversing the motion, bringing the finger again in line of the groove $e'$, and letting go the tube, the trap will instantly spring back to its place over the drain-pipe, and effectually prevent the ingress of foul air and gases.

This trap is cheap, simple, and effective, always under the control of those in the house, and easily applied to any sink, basin, or bath-tub. Placed as it is in full sight, its action can always be observed, and any inefficiency about it at once corrected without calling in the aid of plumbers or other experts.

Having thus described my invention, I claim as new and desire to secure by Letters Patent—

1. An improved sink-trap consisting of disk A, with rim $a'$, ring $b'$, and plate $d'$, tube B, pin C, with grooves $e'$ and $f'$, and nut $g'$, spiral spring D, elastic packing-ring F, stopper G, and pin $h'$ combined, substantially as herein shown and described.

2. A sink-trap consisting of a flanged disk, A, and a tube, B, surrounding a center-pin, C, and actuated by a spiral spring, D, encircling said pin, substantially as herein shown and described.

JOHN THOMAS BLADEN.

Witnesses:
 JOSEPH A. BURR,
 JOS. A. BURR, Jr.